Aug. 14, 1951 J. C. LEBHERZ 2,563,849
TELESCOPE MOUNT FOR RIFLES
Filed May 14, 1947 2 Sheets-Sheet 1
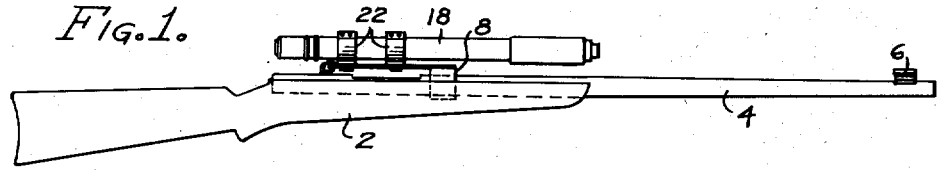
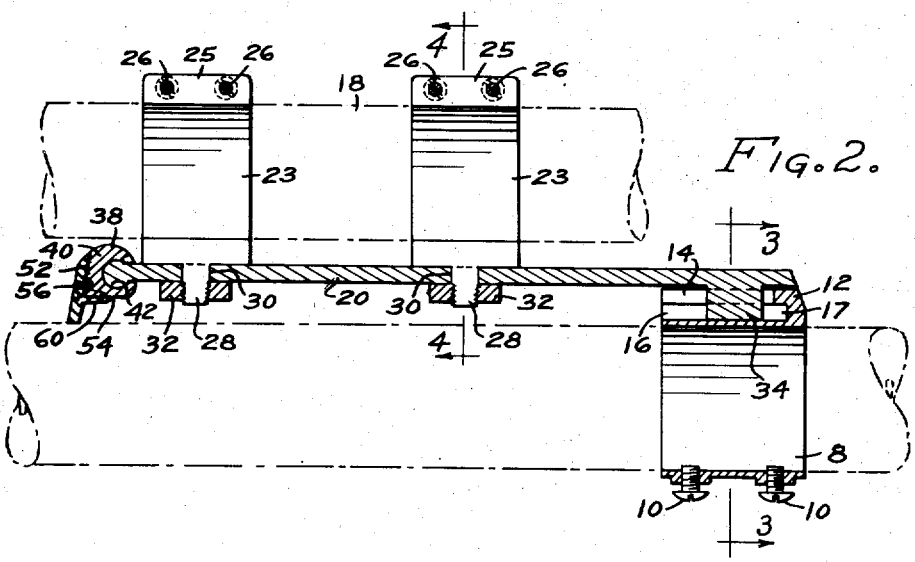
INVENTOR.
JOHN C. LEBHERZ
BY Victor J. Evans & Co.
ATTORNEYS Aug. 14, 1951
J. C. LEBHERZ
2,563,849
TELESCOPE MOUNT FOR RIFLES
Filed May 14, 1947
2 Sheets-Sheet 2
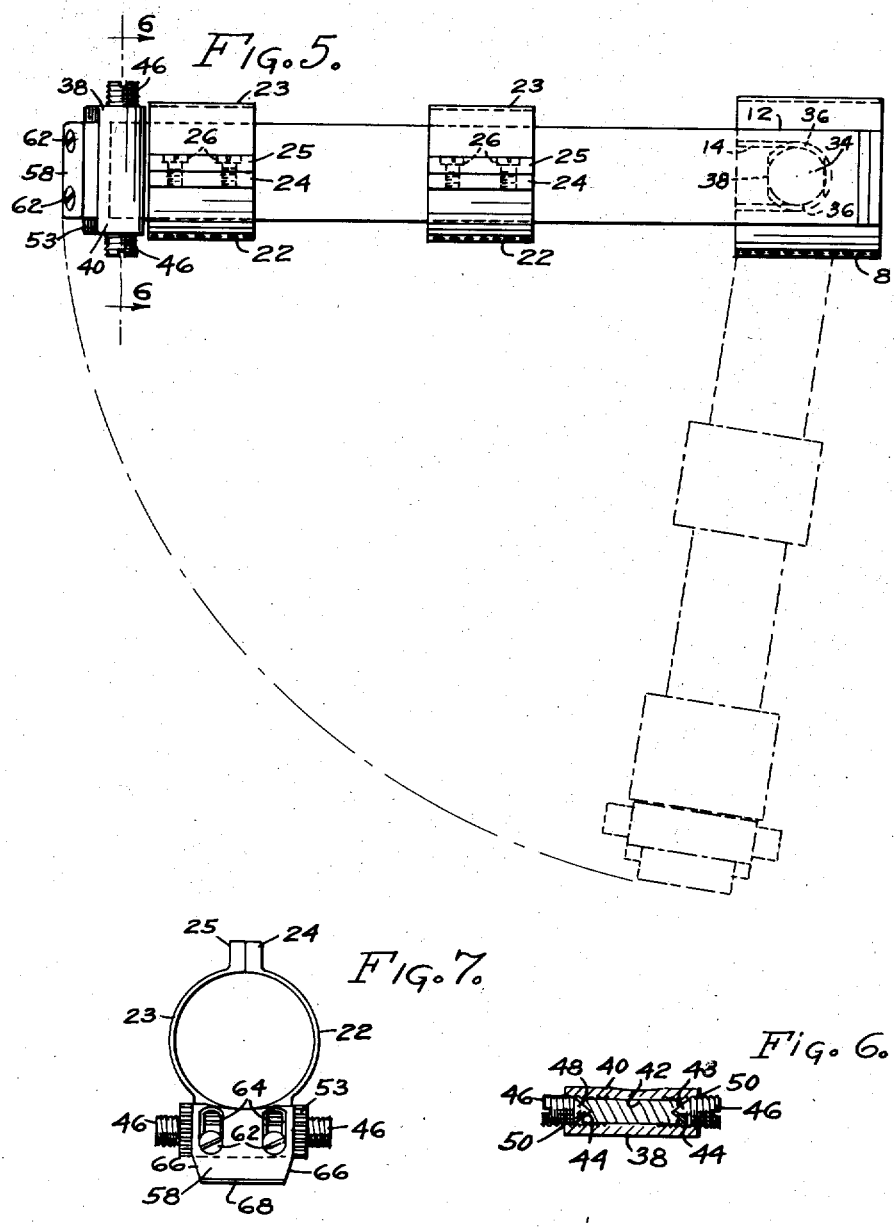
INVENTOR.
JOHN C. LEBHERZ
BY Victor J. Evans & Co.
ATTORNEYS Patented Aug. 14, 1951

2,563,849

UNITED STATES PATENT OFFICE 2,563,849

TELESCOPE MOUNT FOR RIFLES

John C. Lebherz, Anchorage, Alaska

Application May 14, 1947, Serial No. 747,971

1 Claim. (Cl. 33—50)

My present invention relates to an improved telescope mount for rifles and especially to the structure employed whereby the mount may be detachably secured to the rifle and the telescope and the mount may be easily and quickly attached to and detached from the firearm.

In the mount of my invention the spring base is positively secured to the barrel of the rifle and spring tension secures the rear free end, and means are provided to adjust the scope vertically, as well as laterally to account for windage and other factors to be considered in accurate shooting.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 1 is an elevational view of the mount of my invention securing a telescope on a rifle.

Fig. 2 is an enlarged sectional view through the mount.

Figs. 3 and 4 are transverse sectional views at the indicated lines.

Fig. 5 is a top plan view.

Fig. 6 is a sectional view at line 6—6 of Fig. 5.

Fig. 7 is a rear end elevational view of the mount.

Referring now to the drawings, I have illustrated the mount of my invention as used with a conventional rifle comprising a stock 2 and barrel 4 with its front sight 6.

A ring 8 is secured about the rear end of the barrel by screws 10 and the upper extension 12 of the ring has a slot 14 secured at 16 and the recess is enlarged interiorly at 17.

The mount for the telescope 18 consists in a spring base 20 and the split rings comprising sections 22 and 23 have flanges 24—25 secured by screws 26, and the pin extensions 28 of the rings forming bolts pass through openings 30 in the base 20 to receive retaining nuts 32.

The front end of the base has a lug 34 flanged at 36 at opposite sides so that the flat sides 38 may be slid into the slot 14 while the base is at right angles to the barrel, and the mount is then pivoted to alignment with the barrel whereupon the flanges 36 fit into the enlarged recess to secure the lug therein.

The rear end of the mount has a transverse rounded rib 39 to receive the elongated collar 40 having a rounded groove 42 conforming to and receiving the rib 39.

The rib has tapered end recesses 44, and the set screws 46 have pointed ends 48 frictionally engaging the recesses 44, the screws 46 being threadedly engaging the threaded opening 50 of the collar 40 the set screws 46 are windage screws and movement of these screws will cause the rib 39 to slide in the groove 42 for windage calculations of the sight.

The collar 40 has angular flat faces 52 and 54, the former being longitudinally notched or serrated at 53 for co-action with the serrated face or surface 56 of the adjustment plate 58 formed with a flange 60 engaging the face 54 of the collar in normal position as in Figure 2 but out of contact with the face 54 should the collar 40 be adjusted upwardly. Screws 62 in the elongated slots 64 of the plate 58 are threadably mounted in the collar 40 to secure the plate to the collar in adjusted position.

The lower end of the plate is tapered at 66 and the edges are beveled at 68, and the lower edge bears against the receiver of the barrel.

Thus by adjustment of the plate with relation to the collar, the elevation or depression of the base and the telescope may be accomplished. Also the lateral adjustment of the scope and mount may be made by pivoting the mount slightly on the lug 34, the tension of the spring base securing the edge of the plate 58 retaining the mount in adjusted position.

From the above description it will be apparent that the telescope mount of my invention will provide a means for detachably securing the scope to the rifle without drilling or other mutilation of the barrel and the scope and mount may be removed or attached quickly. Tension of the spring mount may be varied by rotation of the collar after loosening of the set screws 46 and when the scope and mount are removed they may be attached again assuring the same position as that provided when removed.

Having thus fully described my invention what I claim as new and desire to secure by Letters Patent is:

A telescope mount for firearms having a slotted receiver on the barrel, a spring base having means at the rear end coacting with the slotted receiver for detachable engagement therewith, telescope embracing rings on the base, a ring adjustably secured to the barrel forwardly of the receiver, means on the base for adjustably connecting said base to said ring, vertical and lateral adjusting means on the rear end of the spring base, a rounded rib on the base, a collar slidably engaged with said rib, a plate secured to said collar and bearing against the barrel, means for securing the plate to the collar in adjusted position to elevate or depress the mount with respect to the barrel and set screws in the collar engaging the ends of the ribs for securing the collar and rib in adjusted position to laterally move the mount in respect to the barrel.

JOHN C. LEBHERZ.

REFERENCES CITED

The following references are of record in the file of this patent:

UNITED STATES PATENTS

| Number | Name | Date |
| --- | --- | --- |
| 1,418,935 | Knoble | June 6, 1922 |
| 1,816,195 | Redfield | July 28, 1931 |
| 1,974,016 | Doe | Sept. 18, 1934 |
| 2,036,290 | McCann | Apr. 7, 1936 |
| 2,125,828 | Turner | Aug. 2, 1938 |
| 2,345,249 | Ferriroli | Mar. 28, 1944 |
| 2,365,976 | Sorensen | Dec. 26, 1944 |

FOREIGN PATENTS

| Number | Country | Date |
| --- | --- | --- |
| 266,848 | Great Britain | 1927 |